United States Patent [19]

Migita et al.

[11] Patent Number: 4,657,454

[45] Date of Patent: Apr. 14, 1987

[54] CHUCK FOR HOLDING ROTARY CUTTING TOOL

[75] Inventors: Shuiti Migita; Hajime Ito, both of Futtsu, Japan

[73] Assignee: Kuroda Precision Industries, Ltd., Kanagawa, Japan

[21] Appl. No.: 810,164

[22] Filed: Dec. 18, 1985

[30] Foreign Application Priority Data

May 22, 1985 [JP] Japan ................ 60-75048[U]
May 22, 1985 [JP] Japan ................ 60-75049[U]

[51] Int. Cl.$^4$ ............................ B23C 1/00; B23B 31/04
[52] U.S. Cl. ........................... 409/234; 279/1 ME; 279/1 N; 279/41 R; 408/239 A
[58] Field of Search ................. 409/234, 232; 408/239 A, 239 R; 279/1 ME, 1 N, 41 R, 41 A, 43, 2 A, 1 B, 9 R, 103

[56] References Cited

U.S. PATENT DOCUMENTS

| | | | |
|---|---|---|---|
| 2,829,899 | 4/1958 | Drew et al. | 279/41 R |
| 4,021,051 | 5/1977 | Toyomoto et al. | 279/1 N |
| 4,379,667 | 4/1983 | Yoshimoto et al. | 409/234 |

FOREIGN PATENT DOCUMENTS

| | | | |
|---|---|---|---|
| 4123987 | 12/1945 | Japan | 279/41 R |
| 56-23774 | 2/1977 | Japan | 409/234 |
| 59-33534 | 9/1984 | Japan | 279/41 R |
| 482766 | 4/1938 | United Kingdom | 279/1 ME |

*Primary Examiner*—William R. Briggs
*Attorney, Agent, or Firm*—Schwartz, Jeffery, Schwaab, Mack, Blumenthal & Evans

[57] ABSTRACT

In a chuck comprising a holding cylinder having a tapered outer circumferential surface and an objective tool or an adapter for holding such a tool inserted therein, and a clamping cylinder rotatably mounted at a predetermined distance from the outer circumferential surface of the holding cylinder, a number of needle rollers being arranged in a plurality of stages along the entire circumference of a gap between the two cylinders to extend along a direction at a predetermined inclined angle α with respect to the common axis of the cylinders, and the needle rollers rotating and revolving upon rotation of the clamping cylinder, thereby contracting and recoverying the holding cylinder, slits are formed in the holding cylinder to allow elasticity of the holding cylinder and to improve oil throwing performance and clamping force of the holding cylinder. The slits will not interfere with smooth rotation of the needle rollers.

In another invention, communication between the inner and outer circumferential surfaces of the holding cylinder through the slits is blocked by seal members so as to prevent egress of dust or cutting chips onto the outer circumferential surface of the holding cylinder through the slits, and to allow smooth rotation of the needle rollers.

5 Claims, 8 Drawing Figures

CHUCK FOR HOLDING ROTARY CUTTING TOOL

BACKGROUND OF THE INVENTION

1. Field of the Invention

The present invention relates to a chuck for holding a rotary cutting tool such as a drill and, more particularly, to a chuck wherein a clamping cylinder is mounted directly or through needle rollers on a holding cylinder having a rotary cutting tool or an adapter for holding such a tool inserted therein, and in which a contracting or recovery force acts on the holding cylinder when the clamping cylinder rotates.

2. Description of the Prior Art

A roll lock-type chuck is known as a chuck for holding a rotary cutting tool as per Japanese Utility Model Publication No. 41-23987. In this chuck, a clamping cylinder is rotatably mounted at a predetermined distance around a holding cylinder in which an objective tool, e.g., a cutting tool, is directly or indirectly inserted. A number of needle rollers are arranged at a plurality of stages along the entire circumference of a ring-like gap or space formed between the two cylinders. The needle rollers are parallel to each other and inclined at predetermined angles with respect to the common axis of the cylinders. When the clamping cylinder is rotated, the needle rollers rotate while they revolve around the axis of the cylinders so as to contract or recover the holding cylinder. In a chuck of this type, since the clamping cylinder is rotated through the needle rollers, friction resistance is small and contraction/recovery of the holding cylinder is easy when compared to conventional chucks.

To the contrary, in a chuck of this type, since the holding cylinder is thin in order to provide a large amount of contraction (deformation amount), its strength is small. Thus, when heavy cutting must be performed, the chuck elastically deforms and the total oscillates.

In addition, in a chuck of the type described above, the holding cylinder and the shank of the cutting tool are in contact with each other along their entire circumferential surfaces. For this reason, when contraction/recovery is performed before cutting, an oil film is formed on the inner circumferential surface (surface holding the shank of the cutting tool) of the holding cylinder, decreasing the holding force. This may cause slippage of the tool or may not allow cutting at all.

In order to solve the above problems, a plurality of slits can be formed in the holding cylinder at predetermined intervals along the circumference so as to extend along the axial direction of the holding cylinder. This may facilitate contraction of the holding cylinder and prevent slippage of the tool. However, when such slits are formed, one end of each needle roller, rolling upon rotation of the clamping cylinder, drops into a slit. Thus, the rotation of the holding cylinder is interfered with, and smooth rotation and revolution of the needle rollers cannot be obtained.

In view of this, a technique is proposed in Japanese Utility Model Publication No. 59-33534 (to be referred to as the first technique hereinafter). In this technique, a thin holding cylinder (outer chuck cylinder) is used. An inner chuck cylinder having a plurality of slits at predetermined intervals along the circumference is inserted in the inner circumferential surface of the holding cylinder. The shank of the cutting tool is held with this inner chuck cylinder.

In the first technique, since a plurality of slits are formed in the inner chuck cylinder, the inner chuck cylinder can be deformed easily. However, since an outer chuck cylinder must also be included, the number of parts is increased. Thus, the chuck becomes large in size and heavy in weight. In addition, since the inner and outer chuck cylinders must be fixed concentrically, the overall cost of the chuck is increased, the machining precision of parts is lowered, and assembly errors are increased.

In order to solve these problems with the first technique and to prevent oscillation and slippage of the tool during cutting, other techniques have also been proposed in Japanese Utility Model Disclosure No. 52-23774 and Japanese Utility Model Publication No. 57-33930 (to be referred to as second and third techniques hereinafter). In the second technique, recessed portions, such as grooves, are formed at predetermined intervals along the inner circumferential surface of the holding cylinder so as not to extend to the outer circumferential surface. In the third technique, deep holes are formed in an end face of the holding cylinder.

In the second technique, since recessed portions, such as grooves, are formed in the inner circumferential surface of the holding cylinder, the contact area with the tool shank is reduced and an increased holding force can be obtained. However, since the distal end of each recessed portion is enlarged in a sector shape during contraction of the holding cylinder, pointed edges are formed at the distal ends of the recessed portions and are pressed into the tool shank. The pointed edges thus cause damage to the shank. Once damaged, the tool shank must be repaired before it can be used again.

Formation of recessed portions such as grooves in the inner circumferential surface of the holding cylinder alone does not solve the problems.

In the third technique, the problem of contact between the entire surfaces of the holding cylinder and the tool shank is also not solved. In addition, in order to form deep holes in an end face, the holding cylinder necessarily becomes thick. This results in a large, heavy chuck. Moreover, since a thick holding cylinder is used, a large force must be applied to deform it. Slippage of the tool cannot be prevented.

SUMMARY OF THE INVENTION

Object

It is an object of the present invention to provide a chuck which is free from all the problems discussed above.

It is another object of the present invention to provide a compact chuck which does not have an increased number of parts, allows easy deformation of a holding cylinder having a tool shank or an adapter holding it inserted therein, with improved oil throwing performance and clamping force.

It is still another object of the present invention to provide a chuck which guarantees sufficient elastic deformation of the holding cylinder to clamp a tool shank, allowing use of a thick holding cylinder to prevent oscillation of the tool and a object being cut during a cutting procedure, and always providing high cutting precision.

It is still another object of the present invention to provide a chuck wherein slits are formed to communicate from the inner circumferential surface (inner diameter) of a holding cylinder to the outer circumferential surface (outer diameter), and despite these slits, egress of dust or cutting chips to the outer circumferential side of the holding cylinder through the slits is prevented, allowing needle rollers revolving around the outer circumferential surface of the holding cylinder to rotate smoothly.

It is still another object of the present invention to provide a chuck which can provide high cutting precision even if heavy cutting is being performed.

Constitution

In order to achieve the above objects of the present invention, as shown in FIGS. 1 to 7, there is proposed a chuck comprising a holding cylinder having a tapered (narrower) outer circumferential surface and an objective tool or an adapter for holding such a tool inserted therein, and a clamping cylinder rotatably mounted at a predetermined distance from the outer circumferential surface of the holding cylinder, a number of needle rollers being arranged at a plurality of stages along the entire circumference of a gap between the two cylinders to extend along a direction at a predetermined inclined angle $\beta$ with respect to the common axis of the cylinders, the needle rollers rotating and revolving upon rotation of the clamping cylinder, thereby contracting and recovering the holding cylinder, wherein a plurality of slits 12, 121, 122 are formed in the holding cylinder 11, 111 to extend from its inner to its outer diameter and crossing the axial direction of the needle rollers 30 at a predetermined angle $\beta$, the needle rollers 30 being able to rotate around the holding cylinder 11, 111 without being interfered with by the slits 12, 121, 122, and the slits 12, 121, 122 are formed as closed slits which do not open to the distal end face of the holding cylinder 11, 111, i.e., which are located at the midportion along the longitudinal axis of the holding cylinder 11, 111.

In order to allow the needle rollers 30 to rotate without being interfered with by the slits 12, 121, 122, the slit width of the slits 12, 121, 122 is set to be less than, e.g., about ¼ the diameter of the needle rollers 30 and the crossing angle $\beta$ is set to be, e.g., about 3° to 5° or more. The specific slit width and crossing angle $\beta$ must be determined in accordance with the relationship of the crossing angle $\beta$ between the slits 12, 121, 122 and the axis and the diameter of the needle rollers 30.

According to the present invention, when the slit 121 is formed to be tapered from a wider inner diameter side 111b to a narrower outer diameter side 111a of a holding cylinder (i.e., the inner diameter side 111b is wider than the outer diameter side 111a), the holding cylinder 11 can be deformed more easily (FIG. 5).

Such closed slits 12, 121, 122 can be formed easily by laser or discharge processing.

According to the present invention, communication from the inner to outer circumferential surfaces of the holding cylinder 111 through the slits 122 formed therein is preferably cut off by seal members 40. The seal members 40 preferably comprise an elastic material such as rubber, resin, or a soft metal, e.g., copper (FIGS. 6 to 7).

As a means for mounting each seal member 40, a deep hole 16 is formed in the holding cylinder 111 from its end face along the slit 122 or along an axis at a predetermined angle therefrom, so as to cross the slit 122 in the radial direction. The seal member 40 is then fitted into the deep hole 16.

A technique for cutting off communication from the inner to outer circumferential surfaces of the holding cylinder using a seal member 40 in this manner is a novel technique. As a result of this technique, egress of dust into the needle roller rolling surface is prevented. Thus, when the chuck of the present invention is used in a casting process or a machining method which produces a lot of fine cutting chips, this prevention is advantageous.

Moreover, this technique is applicable to any chuck having slits 12, including chucks other than the roll lock type, but still using needle rollers 30. When this technique is applied to another type of chuck, a similar effect can be obtained as an independent invention.

Effect

In accordance with the present invention, the slits 12, 121, 122 and the axis of the needle rollers 30 cross each other, and the slits 12, 121, 122 do not interfere with rotation of the needle rollers 30. Therefore, when the clamping cylinder 20 is rotated, even if the needle rollers 30 revolve directly around the outer circumferential surface of the holding cylinder 11, 111, they will not drop into the slits 12 or be interfered with thereby.

The slits 12, 121, 122 are closed slits and do not open onto an end face of the holding cylinder 11. Therefore, the holding cylinder 11, 111 is strong but resilient. As compared to a chuck wherein slits are formed to open onto an end face of the holding cylinder, elasticity of the holding cylinder 11, 111 is improved and immediate recovery is possible. In addition, chipping of or damage to a tool abutting on the open end of the slits 12, 121, 122 is prevented.

Since the slits 12, 121, 122 are closed, a thick holding cylinder 11, 111 can be used. In addition, vibration of the tool and the object being cut during a cutting procedure is prevented, and high cutting precision is always obtained.

According to the present invention, since a plurality of slits 12, 121, 122 are formed in the holding cylinder 11, the cylinder 11, 111 is resilient, and oil throwing performance of the inner circumferential surface thereof is improved, preventing a decrease in clamping force. Since the entire inner circumferential surface of the holding cylinder 11 does not hold the tool shank, the clamping force is not dispersed but concentrated along an axial direction. Therefore, a strong clamping force is obtained and slippage of the cutting tool is prevented.

In the present invention, the needle rollers 30 rotate directly between the outer circumferential surface of the holding cylinder 11, 111 and the inner circumferential surface of the clamping cylinder 20. Therefore, the rollers 30 can directly contract or recover the holding cylinder 11, 111, so that the total number of chuck parts and the cost are reduced, cutting precision is improved, and error factors including assembly errors are decreased.

In accordance with the independent invention, communication from an inner to outer circumferential surface of the holding cylinder 11 the slits 122 is blocked by the seal member 40. Thus, egress of, e.g., cutting chips or dust onto the outer circumferential surface of the holding cylinder on which the needle rollers 30 directly roll can be prevented. As a result, smooth rolling of the needle rollers 30 can be guaranteed.

In accordance with still another independent invention, when a seal member 40 consists of an elastic material such as rubber, resin or a soft metal such as copper, oscillation of the tool and an object being cut during a cutting procedure can be prevented. High cutting precision is therefore obtained, and heavy cutting can be performed.

As a method of mounting the seal member 40, a deep hole 16 is formed in an end face of the holding cylinder 111 along a slit 122 so as to cross it in the radial direction. The seal member 40 is fitted in the deep hole 16. With this arrangement, the seal member 40 can be easily mounted, and the slit 122 can be sealed firmly and reliably.

BRIEF DESCRIPTION OF THE DRAWINGS

FIGS. 1A to 3 show an embodiment of a chuck according to the present invention in which FIG. 1A is a partially cutaway front view, FIG. 2 is a front view of a holding cylinder section, and FIG. 3 is a sectional view along line A—A of FIG. 2;

FIGS. 4 and 5 show a modification of the present invention using a modified holding cylinder, in which FIG. 4 is a front view of the main section thereof and FIG. 5 is a partial perspective view of the main section along line B—B of FIG. 4; and FIGS. 6 and 7 show another embodiment of the present invention, assemblying seal members in the chuck of the above embodiment, in which FIG. 6 is a front view of a holding cylinder section and FIG. 7 is a sectional view along line D—D of FIG. 6.

DETAILED DESCRIPTION OF THE PREFERRED EMBODIMENTS

Figure 1A:
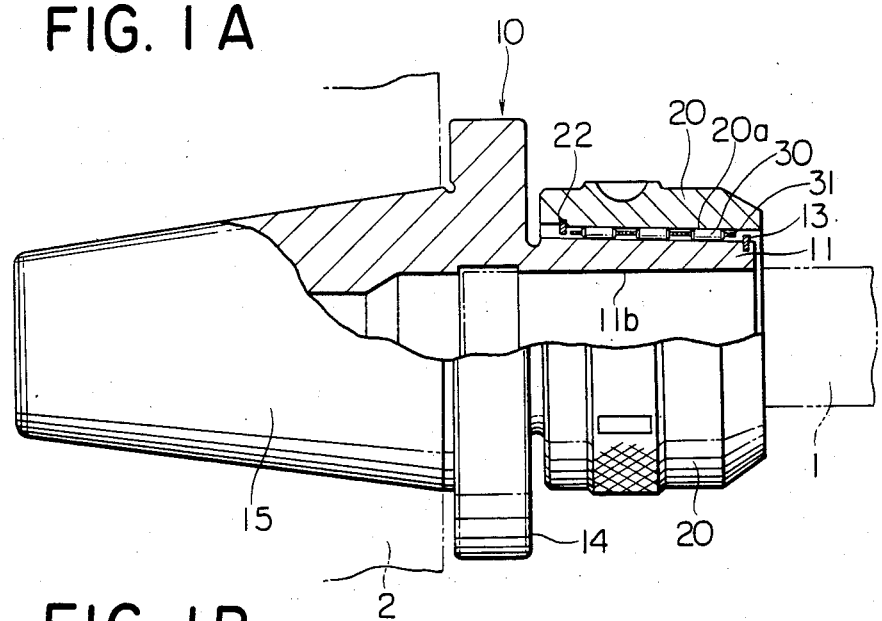
Figure 1B:
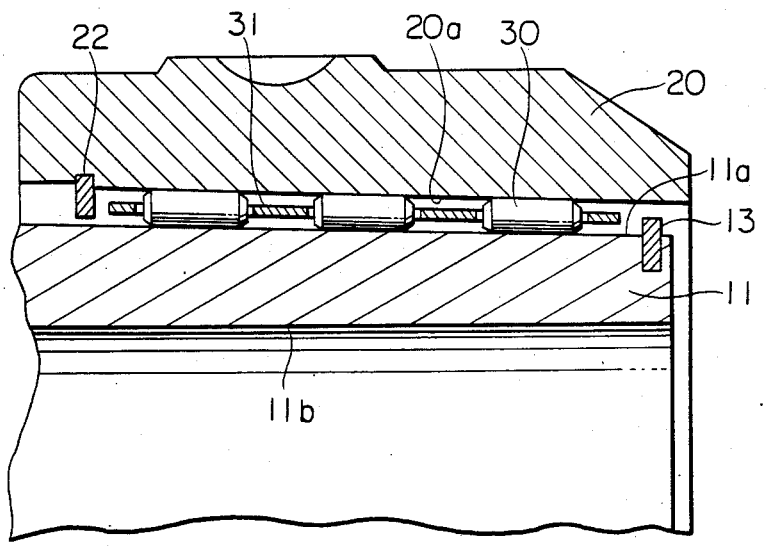
FIG. 1B is an enlarged view of the main section thereof.

The preferred embodiments of the present invention will now be described in detail with reference to the accompanying drawings. It is to be noted, however, that the specific sizes, materials, shapes, and relative arrangements of constituent parts of the embodiments are only illustrative examples and are not intended to limit the scope of the present invention.

Referring to FIGS. 1A to 3, reference numeral 10 denotes a holder main body mounted on a spindle 2. A shank 15 and a holding cylinder 11 are formed integrally thereon through a flange 14 along an axis C–C'.

The holding cylinder 11 has a cylindrical inner circumferential surface 11b and an outer circumferential surface 11a. The cylindrical inner circumferential surface 11b directly holds a cutting tool 1 as an objective tool, or an adapter (not shown) for holding the tool 1 therein. The outer circumferential surface 11a is tapered from its proximal end to its distal end. A clamping cylinder 20 is rotatably mounted around, and at a predetermined distance from, the surface 11a. The clamping cylinder 20 has an inner circumferential surface 20a which is tapered similarly to the surface 11a.

Figure 2:
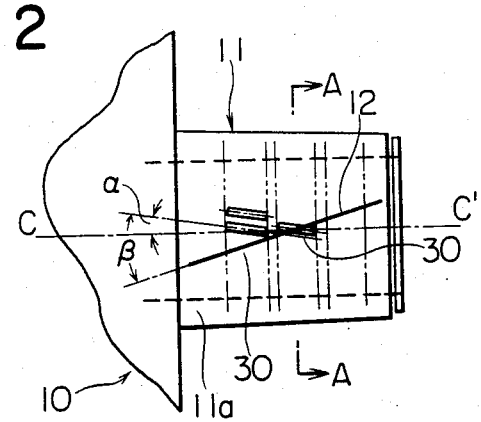
Figure 3:
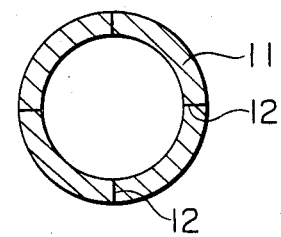

A number of needle rollers 30 are rotatably held at predetermined positions by roller cages (retainers) 31 at a plurality of stages along the entire circumference of the ring-shaped gap between the inner circumferential surface 20a of the clamping cylinder 20 and the outer circumferential surface 11a of the holding cylinder 11. The direction of array of the needle rollers 30 is inclined at an inclination angle $\alpha$ with respect to the axis C–C' of the clamping cylinder 20 and the holding cylinder 11, as shown in FIG. 2.

The inclination angle $\alpha$ can be set appropriately to allow smooth rotation of the needle rollers 30, e.g., at 1° to 2°.

Reference numerals 13 and 22 denote stop rings which are mounted on the circumferential surfaces 11a and 20a of the cylinders 11 and 20, so as to regulate axial movement of the roller cages 31.

With the above-mentioned arrangement, upon forward or reverse rotation of the clamping cylinder 20, the needle rollers 30 rotate about their axes while they revolve about the axis of the cylinders 11 and 20 so as to contract or recover the holding cylinder 11.

In this embodiment, four slits 12 are formed at 90° angular intervals in the holding cylinder 11 of the holder main body 10. The slits 12 extend from the outer circumferential surface 11a to the inner circumferential surface 11b.

As shown in FIG. 2, the slits 12 extend from a position near the proximal end of the cylinder 11 to a position near the distal end thereof. Thus, the slits 12 linearly extend at the midportion of the holding cylinder 11, along its longitudinal axis.

Each slit 12 is inclined at a predetermined angle with respect to the axis C–C' of the holding cylinder 11. The crossing angle $\beta$ between the needle rollers 30 and the slits 12 is set to exceed the inclination angle $\alpha$ (1° to 2°) between the axis C–C' of the cylinder 11 and 20 and the axis of the needle rollers 30. The crossing angle $\beta$ is set to be, e.g., about 3° to 5°. The slit width of each slit 12 is set to be narrower than the diameter (2 mm) of the needle rollers 30. The slit width of each slit 12 is set to be, e.g., 0.5 mm or less.

In this manner, the crossing angle $\beta$ between the needle rollers 30 and the slits 12 is set to be about 3° to 5° and the slit width of each slit 12 is set to be considerably narrower than the diameter (2 mm) of the needle rollers 30. In addition, the needle rollers 30 are rotatably mounted at predetermined positions by means of the roller cages (retainers) 31. For these reasons, even when the needle rollers 30 revolve directly around the outer circumferential surface 11a of the holding cylinder 11 upon rotation of the clamping cylinder 20, proper operation of the needle rollers 30 is not prevented by the presence of the slits 12 and the needle rollers 30 can rotate smoothly.

In this embodiment, since the slits 12 are closed slits, the holding cylinder 11 can have a predetermined strength and be resilient.

Figure 4:
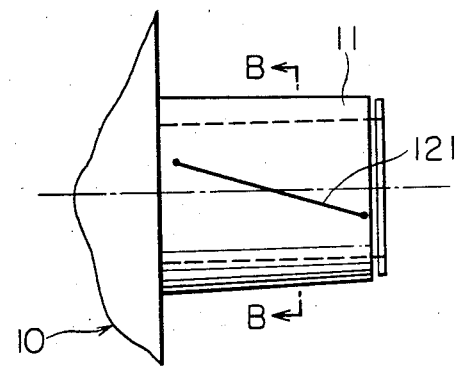
Figure 5:
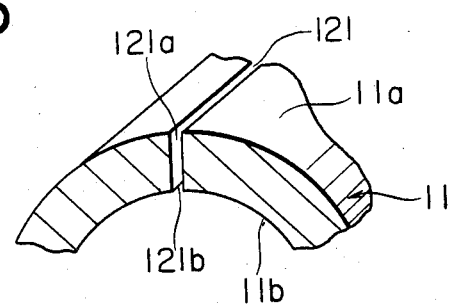

FIGS. 4 and 5 show a modification of the present invention having a holding cylinder 11 with different slits 121. As shown in FIG. 5, an inner diameter side 121b of each slit 121 is set to be wider than its outer diameter side 121a. In other words, the slit 121 is tapered from the wider inner diameter side 121b to the narrower outer diameter side 121a. With this arrangement, the holding cylinder 11 is more resilient than the holding cylinder 11 in which each slit 12 has inner and outer diameter sides of the same size.

Figure 6:
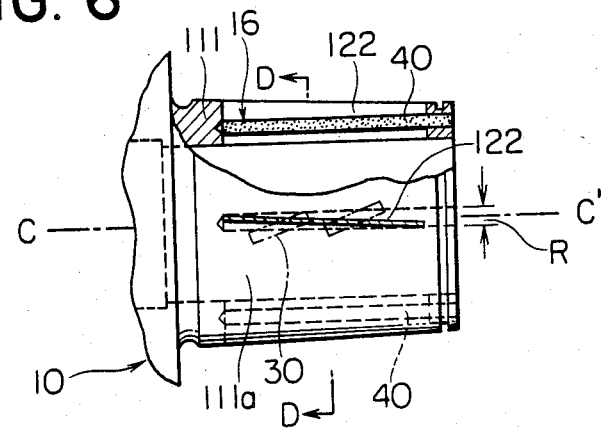
Figure 7:
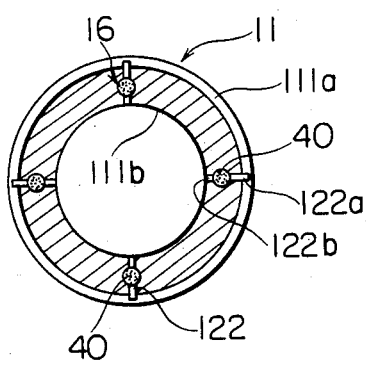

FIGS. 6 and 7 show another embodiment of the present invention in which seal members are fitted in slits formed in a holding cylinder. Referring to FIGS. 6 and 7, the same reference numerals denote the same parts as in the first embodiment.

Deep holes 16 having a diameter R are formed from a distal end face of a holding cylinder 111 to extend at positions corresponding to slits 122, along an axis C–C'. The diameter R is slightly larger than the width of the slit 122. More specifically, the diameter R is slightly larger than the widths of the proximal and distal ends of the slit 122. Seal members 40, of an elastic material such as rubber, are fitted in the deep holes 16. The open ends of the holes 16 exposing the seal members 40 are fixed with an adhesive, as needed. With this arrangement, the seal members 40 can be easily and firmly mounted in the deep holes 16.

Each slit 122 is inclined at a predetermined angle (about 2° to 2°) with respect to the axis C–C' within a range of the diameter of the deep hole 16 formed to extend along the axis C–C', such that the crossing angle $\beta$ between needle rollers 30 and the slits 122 is about 3° to 5°.

In this embodiment, since inner and outer circumferential surfaces 111b and 111a of the holding cylinder 111 are completely shielded in a radial direction, dust or cutting chips will not egress onto the outer circumferential surface 111a during cutting or preparation therefor and thus will not prevent normal rotation of the needle rollers 30. The elastic property of the seal members 40 prevents oscillation of the tool or an object being cut during a cutting procedure. High cutting precision can thus be obtained, even during heavy cutting.

The deep holes 16 can be slightly inclined with respect to the axis C–C' in the same direction as the slits 122. In each slit 122, its inner diameter side 111b can be formed parallel to the axis C–C' and its outer diameter side 111a can be inclined at a predetermined crossing angle $\beta$ with respect to the needle rollers 30. These modifications are considered to fall within the technical scope of the present invention.

What is claimed is:

1. A chuck comprising:
   a holding cylinder having a tapered outer circumferential surface and an objective tool or an adapter for holding such a tool inserted therein, a plurality of slits being formed in said holding cylinder to extend from its inner to its outer diameter, and said slits being formed as closed slits which do not open onto a distal end face of said holding cylinder and which are located at a midportion along a longitudinal axis of said holding cylinder;
   a clamping cylinder rotatably mounted at a predetermined distance from the outer circumferential surface of said holding cylinder; and
   a number of needle rollers arranged in a plurality of stages along the entire circumference of a gap between said cylinders to extend along a direction at a predetermined inclination angle $\alpha$ with respect to the common axis of said cylinders, said plurality of slits crossing the axial direction of said needle rollers at a predetermined angle $\beta$, and said needle rollers being rotatable around said holding cylinder and revolvable without being interfered with by said slits, thereby contracting and recoverying said holding cylinder.

2. A chuck according to claim 1, wherein the crossing angle $\beta$ between said slits and the axis of said needle rollers is set to be about 3° to 5°, and the slit width of said slits is set to be about ¼ or less a diameter of said needle rollers.

3. A chuck according to claim 1, wherein each of said slits in said holding cylinder is formed such that an outer diameter side thereof is wider than an inner diameter side thereof.

4. A chuck comprising:
   a holding cylinder having a tapered outer circumferential surface and an objective tool or an adapter for holding such a tool inserted therein, a plurality of slits being formed in said holding cylinder to extend from its inner to its outer diameter;
   a clamping cylinder rotatably mounted at a predetermined distance from the outer circumferential surface of said holding cylinder; and
   a number of needle rollers arranged in a plurality of stages along the entire circumference of a gap between said cylinders, said holding cylinder having an end face in which deep holes are formed to extend from said end face along said slits so as to cross said slits in a radial direction, and said deep holes receive seal members therein, wherein communication between the inner and outer circumferential surfaces of said holding cylinder through said slits is blocked by said seal members.

5. A chuck according to claim 4, wherein said seal members consist of an elastic material such as rubber, resin, or a soft metal such as copper.

* * * * *